United States Patent
Gong (10) Patent No.: US 11,531,516 B2
(45) Date of Patent: Dec. 20, 2022

(54) INTELLIGENT VOLUME CONTROL

(71) Applicant: SAMSUNG ELECTRONICS CO., LTD., Suwon-si (KR)

(72) Inventor: Songjie Gong, Jiangsu (CN)

(73) Assignee: SAMSUNG ELECTRONICS CO., LTD., Suwon-si (KR)

( * ) Notice: Subject to any disclaimer, the term of this patent is extended or adjusted under 35 U.S.C. 154(b) by 75 days.

(21) Appl. No.: 16/748,250

(22) Filed: Jan. 21, 2020

(65) Prior Publication Data
US 2020/0233636 A1    Jul. 23, 2020

(30) Foreign Application Priority Data

Jan. 18, 2019    (CN) .................. 201910048572.X
Jan. 20, 2020    (WO) ............... PCT/KR2020/000968

(51) Int. Cl.
| | |
|---|---|
| *H03G 3/20* | (2006.01) |
| *G06F 3/16* | (2006.01) |
| *G06K 9/62* | (2022.01) |
| *G06N 3/04* | (2006.01) |
| *G10L 25/51* | (2013.01) |
| *G10L 25/30* | (2013.01) |
| *G06N 3/08* | (2006.01) |
| *G06V 20/00* | (2022.01) |

(52) U.S. Cl.
CPC ........... *G06F 3/165* (2013.01); *G06K 9/6256* (2013.01); *G06K 9/6262* (2013.01); *G06N 3/0454* (2013.01); *G06N 3/08* (2013.01); *G06V 20/00* (2022.01); *G10L 25/30* (2013.01); *G10L 25/51* (2013.01)

(58) Field of Classification Search
CPC ....................................................... H03G 3/20
See application file for complete search history.

(56) References Cited

U.S. PATENT DOCUMENTS

| | | |
|---|---|---|
| 9,189,252 B2 | 11/2015 | Chu et al. |
| 9,288,594 B1 | 3/2016 | Polansky et al. |
| 2013/0287215 A1 | 10/2013 | Kim et al. |

(Continued)

FOREIGN PATENT DOCUMENTS

| | | |
|---|---|---|
| CN | 105704555 A | 6/2016 |
| CN | 205389262 U | 7/2016 |

(Continued)

OTHER PUBLICATIONS

Communication dated May 4, 2020 issued by the International Searching Authority in counterpart Application No. PCT/KR2020/000968 (PCT/ISA/220, PCT/ISA/210, and PCT/ISA/237).

(Continued)

*Primary Examiner* — Olisa Anwah
(74) *Attorney, Agent, or Firm* — Sughrue Mion, PLLC (57) ABSTRACT

An electronic device includes: a memory storing instructions; and at least one processor configured to execute the instructions stored in the memory to control the at least one processor to: identify a location of the electronic device; obtain an image and a sound signal corresponding to the location; identify, using a trained neural network, a scene where the electronic device is present, based on the image, the sound signal, and the location; and provide settings of the electronic device based on the identified scene.

19 Claims, 7 Drawing Sheets

(56) References Cited

U.S. PATENT DOCUMENTS

| | | | |
|---|---|---|---|
| 2015/0120291 A1 | 4/2015 | Xue et al. | |
| 2016/0149547 A1* | 5/2016 | Rider | H03G 3/3005 |
| | | | 381/57 |
| 2017/0242651 A1 | 8/2017 | Lang et al. | |
| 2017/0330267 A1 | 11/2017 | Cahall, Jr. et al. | |
| 2017/0344854 A1 | 11/2017 | Behringer et al. | |
| 2018/0189568 A1* | 7/2018 | Powderly | G06K 9/00335 |
| 2018/0307979 A1* | 10/2018 | Selinger | G06F 9/46 |
| 2019/0194492 A1 | 6/2019 | Yu et al. | |
| 2019/0213443 A1* | 7/2019 | Cunningham | G06K 9/78 |
| 2020/0327378 A1* | 10/2020 | Smith | G06N 5/048 |
| 2021/0248427 A1* | 8/2021 | Guo | G06K 9/4628 |

FOREIGN PATENT DOCUMENTS

| | | |
|---|---|---|
| CN | 107078706 A | 8/2017 |
| CN | 107122161 A | 9/2017 |
| CN | 107395873 A | 11/2017 |
| CN | 107734126 A | 2/2018 |
| CN | 107871001 A | 4/2018 |
| CN | 107896355 A | 4/2018 |
| CN | 108710847 A | 10/2018 |
| CN | 108733342 A | 11/2018 |
| WO | 2018/063243 A1 | 4/2018 |

OTHER PUBLICATIONS

Communication dated Sep. 17, 2021 issued by the China National Intellectual Property Administration in Chinese Application No. 201910048572.X.

Yufang, W., et al., "Adaptive Broadcast Volume Control System Based on Ambient Noises", Process Automation Instrumentation, vol. 37, No. 12, Dec. 2016, pp. 14-17.

Felber, F., "An Automatic Volume Control For Preserving Intelligibility", 34th IEEE Sarnoff Symposium, May 2011, 5 pages.

* cited by examiner

INTELLIGENT VOLUME CONTROL

CROSS-REFERENCE TO RELATED APPLICATION(S)

This application is based on and claims priority under 35 U.S.C. § 119(a) to Chinese Patent Application No. 201910048572.X, filed on Jan. 18, 2019, in the State Intellectual Property Office of P.R. China, and Patent Cooperation Treaty Application No. PCT/KR2020/000968 filed on Jan. 20, 2020 in the Korea Intellectual Property Office, the disclosure of which is incorporated by reference herein in its entirety.

BACKGROUND

1. Field

The disclosure relates to an artificial intelligence (AI) technology. More particularly, the disclosure relates to volume control based on AI.

2. Description of Related Art

An artificial intelligence (AI) system may refer to a computer system that enables machines to become smart by learning and making decisions on their own, compared to an existing rule-based smart system. The AI system may improve its recognition rates and is capable of understanding a user's preferences more accurately through experience. Thus, existing rule-based smart systems are increasingly being replaced by deep learning-based AI systems.

AI technology may include machine learning (deep learning) and element technologies using the machine learning. Machine learning may refer to an algorithmic technique for autonomously classifying/learning features of input data, and element technologies are technologies for simulating functions of a human brain such as cognition and decision-making using machine learning algorithms and include technical fields such as linguistic understanding, visual understanding, reasoning/prediction, knowledge representation, motion control, etc.

Various technical fields to which AI technology may be applied are, for example, as follows. Linguistic understanding may refer to a technology for recognizing human language/characters for application/processing and includes natural language processing, machine translation, a dialog system, question answering, speech recognition/synthesis, etc. Visual understanding may refer to a technology for recognizing and processing an object, in the same way as performed by a human visual system, and includes object recognition, object tracking, image retrieval, person recognition, scene understanding, spatial understanding, image enhancement, etc. Reasoning/prediction may refer to a technology for judging information and logically inferring and predicting new information and includes knowledge/probability-based interference, optimization prediction, preference-based planning, recommendations, etc. Knowledge representation may refer to a technology for automatically processing information about human experience as knowledge data and includes knowledge construction (data generation/classification), knowledge management (data utilization), etc. Motion control may refer to a technology for controlling autonomous driving of a vehicle and motion of a robot and includes movement control (navigation, collision avoidance, and travelling), manipulation control (action control), etc.

The demand for easy control of various external devices has been increasing, and accordingly, there is a need for a technology for effectively registering various types of external devices using various formats of data and efficiently controlling various external devices by appropriately combining functions of the external devices.

SUMMARY

Provided is intelligent volume control for adaptive volume recommendation or adjustment.

Additional aspects will be set forth in part in the description which follows and, in part, will be apparent from the description, or may be learned by practice of the presented embodiments.

In accordance with an aspect of the disclosure, there is provided an electronic device including: a memory storing instructions; and at least one processor configured to execute the instructions stored in the memory to: identify a location of the electronic device; obtain an image and a sound signal corresponding to the location; identify, using a trained neural network, a scene where the electronic device is present, based on the image, the sound signal, and the location; and provide settings of the electronic device based on the identified scene.

In accordance with an aspect of the disclosure, there is provided a method including: identifying a location of an electronic device; obtaining an image and a sound signal corresponding to the location; identifying, using a trained neural network, a scene where the electronic device is present, based on the image, the sound signal, and the location; and providing settings of the electronic device based on the identified scene.

In accordance with an aspect of the disclosure, there is provided a computer program product includes a non-transitory computer readable recording medium having stored therein a program for performing the method.

BRIEF DESCRIPTION OF THE DRAWINGS

The above and other aspects, features, and advantages of certain embodiments of the disclosure will be more apparent from the following detailed description taken in conjunction with the accompanying drawings, in which.

DETAILED DESCRIPTION

Various example of the disclosure will now be described in greater detail below with reference to the accompanying drawings. However, the disclosure may have different forms and should not be understood as being limited to embodiments set forth herein. Parts not related to the disclosure may be omitted for clarity. Throughout the drawings, it should be noted that like reference numbers are used to depict the same or similar elements, features, and structures.

The terms and words used in the following description and claims are not limited to the bibliographical meanings, but, are merely used by the inventor to enable a clear and consistent understanding of the disclosure. Accordingly, it should be apparent to those skilled in the art that the following description of various embodiments of the disclosure is provided for illustration purpose only and not for the purpose of limiting the disclosure as defined by the appended claims and their equivalents.

It is to be understood that the singular forms "a," "an," and "the" include plural referents unless the context clearly dictates otherwise. Thus, for example, reference to "a component surface" includes reference to one or more of such surfaces.

As used herein, the singular forms "a", "an" and "the" are intended to include the plural forms as well, unless the context clearly indicates otherwise. It should be understood that the terms "comprising," "including," and "having" are inclusive and therefore specify the presence of stated features, numbers, steps, operations, components, units, or their combination, but do not preclude the presence or addition of one or more other features, numbers, steps, operations, components, units, or their combination. In particular, numerals are to be understood as examples for the sake of clarity, and are not to be construed as limiting the embodiments by the numbers set forth.

Herein, the terms, such as " . . . unit" or " . . . module" should be understood as a unit in which at least one function or operation is processed and may be embodied as hardware, software, or a combination of hardware and software.

It should be understood that, although the terms "first," "second," etc. may be used herein to describe various elements, and these elements should not be limited by these terms. These terms are used to distinguish one element from another. For example, a first element may be termed a second element within the technical scope of an embodiment of the disclosure.

Expressions, such as "at least one of" when preceding a list of elements, modify the entire list of elements and do not modify the individual elements of the list. For example, the expression "at least one of a, b or c" indicates only a, only b, only c, both a and b, both a and c, both b and c, all of a, b, and c, or variations thereof.

According to embodiments, functions related to artificial intelligence (AI) may operate via a processor and a memory. The processor may include one or more processors. The one or more processors may include a general-purpose processor such as a central processing unit (CPU), an application processor (AP), a digital signal processor (DSP), a dedicated graphics processor such as a graphical processing unit (GPU) or a vision processing unit (VPU), a dedicated AI processor such as a neural processing unit (NPU), or the like, but is not limited thereto. The one or more processors may control input data to be processed according to predefined operation rules or an AI model stored in the memory. When the one or more processors are a dedicated AI processor, the dedicated AI processor may be designed with a hardware structure specialized for processing a specific AI model.

The predefined operation rules or AI model may be created via a training process. The predefined operation rules or AI model may, for example, be set to perform desired characteristics (or purpose) created by training a basic AI model with a learning algorithm that utilizes a large number of training data. The training process may be performed by a device for performing AI or a separate server and/or system. Examples of the learning algorithm may include, without limitation, supervised learning, unsupervised learning, semi-supervised learning, and reinforcement learning, but embodiments of the disclosure are not limited thereto.

The AI model may include a plurality of neural network layers. Each of the neural network layers may have a plurality of weight values and may perform various neural network computations via arithmetic operations on results of calculations in a previous layer and a plurality of weight values in the current layer. A plurality of weights in each of the neural network layers may be optimized by a result of training the AI model. For example, a plurality of weights may be updated to reduce or minimize a loss or cost value acquired by the AI model during a training process. An artificial neural network may include, for example, and without limitation, a deep neural network (DNN) and may include, for example, and without limitation, a convolutional neural network (CNN), a DNN, a recurrent neural network (RNN), a restricted Boltzmann machine (RBM), a deep belief network (DBN), a bidirectional recurrent DNN (BRDNN), deep Q-networks (DQN), or the like, but is not limited thereto.

Hereinafter, various embodiments of the disclosure will be described in greater detail with reference to the accompanying drawings.

Users may interact with physical keys or virtual touches on his or her electronic device to adjust volume of the electronic device. By a framework layer of the electronic device, different logical devices may be defined at a hardware abstraction layer of the electronic device, thereby, ring tones may have different sound types.

There are many volume types in an electronic device, such as a ringtone volume of an incoming call, a media player volume, a keyboard volume, an alarm clock volume, a call volume and the like. A volume type may be adjusted by sharing one logical device with another volume type. Some volume types may be adjusted separately by each logical device. Users may prefer different settings for volume types according to various scenarios. For example, in a noisy environment, a user may prefer increased call volume, or sometimes wearing earphone. When a user listens to music in a quiet environment, the user may keep on adjusting volume of his or her electronic device to find his most satisfactory volume. Such volume adjustment may harm user experience, and may be difficult for some users who are not familiar with their electronic devices.

According to various embodiments, based on machine learning, scenes and habits of a user may be analyzed based on information collected by various sensors of an electronic device, and intelligent settings of all volumes (including a ringtone volume of an incoming call, media player volume, keyboard volume, alarm clock volume, call volume and the like) of the electronic device may be completed with continuous automatic learning and optimization to make each of all the volumes match the volume that the user really needs in each scene.

Herein, an electronic device may be a smartphone, tablet, speaker, hub, home-hub, router, television, personal digital assistant, media player, portable multimedia player, e-book reader; digital broadcast device, personal computer, laptop computer, micro server, navigation, music player, digital camera, mobile device, vehicle, or the like, but is not limited thereto. The electronic device may be referred to as a device, a terminal, a user device, a user equipment herein.

The electronic device may be a wearable device, for example, a watch, glasses, a band, a head-gear, a head-mounted-device, a hair band, a ring, a glove, a bag, or the like, having a communication function and a data processing function, but is not limited thereto. The electronic device may be a sound output device, for example, an earbuds, an earphone, a wireless earphone, a headphone, a headset, a neckband speaker, a speaker, or the like, but is not limited thereto.

Figure 1:
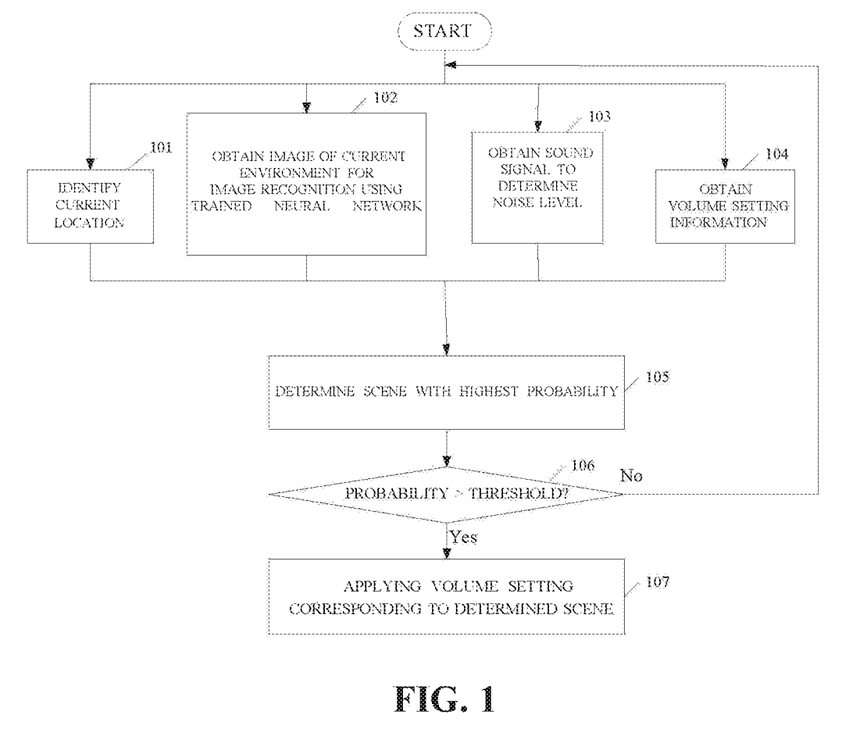
FIG. 1 is a basic flow diagram illustrating an example method for volume control, according to an embodiment.

FIG. 1 is a basic flow diagram illustrating an example method for volume control, according to an embodiment. As shown in FIG. 1, the method may include the following operations, but is not limited thereto.

In operation 100, personalized volume settings corresponding to user scenes may be preset. Herein, a scene or user scene may indicate a certain environment of a location where a user is present with his or her electronic device, and the scene may be referred to as a scenario. The scene may be named based on its noisiness or quietness for the sake of brevity, but scenes may be distinguished by their characteristics of environments. Scenes, even corresponding to the same place, may be different from each other because of present circumstances around a user. For example, it is advised to turn off or mute phones during the movie in a theater, but people would turn on phones or increase phone volume after the movie ends. Herein, a scene type may refer to a certain location, and a scene may refer to a certain situation in a certain location.

A set of various volume settings may be applied to each of different scenes. Classification of scenes may be carried out as required. According to an embodiment, a scene may be represented by a combination of a location and a degree of quietness or noisiness, for example, a quiet train station, or noisy train station, but is not limited thereto. An example of relationship between scenes and their corresponding volume settings are shown in Table 1 below.

TABLE 1

|  | Call | System | Ringtone | Multimedia | Alarm | Notification | Key | BT | TTS |
|---|---|---|---|---|---|---|---|---|---|
| Scene 1 | 0~5 | 0~7 | 0~7 | 0~15 | 0~7 | 0~7 | 0~15 | 0~15 | 0~15 |
| Scene 2 | 0~5 | 0~7 | 0~7 | 0~15 | 0~7 | 0~7 | 0~15 | 0~15 | 0~15 |
| Scene 3 | 0~5 | 0~7 | 0~7 | 0~15 | 0~7 | 0~7 | 0~15 | 0~15 | 0~15 |
| Scene 4 | 0~5 | 0~7 | 0~7 | 0~15 | 0~7 | 0~7 | 0~15 | 0~15 | 0~15 |
| Scene 5 | 0~5 | 0~7 | 0~7 | 0~15 | 0~7 | 0~7 | 0~15 | 0~15 | 0~15 |
| ... | ... | ... | ... | ... | ... | ... | ... | ... | ... |

In operation 101, current location information of the terminal is collected. The current location information of the terminal may be collected by a global positioning system (GPS) sensor of the terminal, but is not limited thereto. For example, a location of the terminal may be determined based on a network to which the terminal is connected to, such as, an access point, a base-station, a hub, or the like, but is not limited thereto. The location of the terminal may be determined based on receiving location information from the network or calculating a location of the terminal based on a radio signal between the network and the terminal. The location of the terminal may be determined based on various positioning methods, for example, and without limitation, inertial-measurement-based positioning method, pseudo-lites-based positioning method, radio frequency identification (RFID)-based positioning method, floor-sensor-based positioning method, magnetic-system-based positioning method, or the like, and the terminal may include an unit for positioning its location.

The location information of the terminal may be used to assist in determining scene information indicating a scene where the user is most likely to be present. For example, according to a distance between a current location of the terminal and a location of each scene of scene information, probability that a user is present in each scene may be calculated. Probability information indicating the probability that the user is present in each scene may be used in determining a scene where the user is most likely to be present, the determined scene may be represented by the scene information.

In operation 102, an image of a current environment may be obtained and recognized to obtain an image recognition result based on the recognized image. Environmental information may be determined according to the image recognition result. That is, environments around a user may be identified according to the image recognition result. The environment information may indicate the environments around the user. The image recognition result may be related to an object recognized in the image. The image recognition result may include information regarding possibility that an object recognized in the image is matched with an actual object. The environment information may be referred to as first environment information.

For image recognition, the image of the current environment may be obtained and input into an image recognition model which has been generated by training, and the image recognition model may perform image recognition according to a photo model repository. Through the image recognition model above, environmental information indicating environments reflected in the image may be recognized accurately through extensive machine learning. According to an embodiment, image learning and recognition may be carried out by a convolutional neural network (CNN). Details of image recognition will be described below.

Environmental information may be determined after the image recognition result is obtained through the image recognition. An object may be recognized in the image based on the image recognition, and the recognized object may be output as the image recognition result so as to identify environments around a user. Generally, the image recognition result may include information regarding probability that the object is present in the image. For example, the image recognition result may include information indicating that probability that "ceiling" is present in the image is 60%, etc. The image recognition result may include probability information of a plurality of objects. After obtaining the image recognition results, an object with the highest probability may be identified as the environmental information for determining scenario scene where the user is most likely to be present. An recognized object may be limited to a certain types of objects to be used to determine a scene where is a user is likely to be present, for example, a top surface of a space such as a ceiling, a bottom surface of a space such as a floor, a side surface of a space such as a wall or partition, but is not limited thereto.

In operation 103, a sound signal may be collected. For example, a sound signal at the current environment may be collected. Furthermore, a noise level of the collected sound signal may be determined. A sound signal at a current location of the terminal may be collected, which may be performed while, before or after obtaining an image of the current location. The noise level may be referred to as noisiness degree, a decibel value, or a volume value of the environment or the collected sound signal.

Noisiness degree of the current environment may be reflected visually by the volume value of the collected sound signal. The noise level may be represented by decibel.

According to an embodiment, speech recognition may be performed on the collected sound signal for determining a scene where a user is most likely to be present.

Through the processing above, the current environmental information may be collected, the current environmental information may include information regarding a location, an image and sound. According to an embodiment, operation 104 of receiving an input from a user may be further performed.

In operation 104, information regarding volume setting input by the user may be collected.

The user may manually set a volume for the current scene. In the disclosure, volume settings of users may also be received, and the volume settings of users may have precedence over other factors.

The operations 101 to 104 may be performed in any order or in parallel, and may not be performed in the order from 101 to 104.

According to an embodiment, after completing information collection, the scene where the user is most likely to be present may be identified by performing the following operations.

In operation 105, a scene with the highest probability may be identified according to the environmental information, the noise level and the current location information.

Probability information of each possible scene may be determined according to the environmental information, the noise level and the current location information determined in the operations above, and the scene with the highest probability may be identified as a current scene where a user is most likely to be present. The probability information may include information regarding probability that the identified scene is matched with a scene where the user is actually presents. The probability information may be referred to as matching information.

In operation 106, whether probability of the scene determined in operation 105 is greater than a set probability threshold may be determined to further proceed. Operation 107 may be performed when the probability of the scene exceeds the threshold. Operations 101 to 104 may be performed iteratively when the probability of the scene does not exceed the threshold. According to an embodiment, the threshold may be equal to 90%. When the threshold is too low, settings of the terminal may be adjusted inappropriately. When the threshold is too high, settings of the terminal may be hardly adjusted.

When the probability that the user is present in the scene reaches or exceeds the probability threshold, it may be considered that a current scene where the user is actually present is highly consistent or matched with the identified scene. Then, the volume may be recommended or set directly through operation 107. When the determined probability of the scene does not reach or exceed the probability threshold, it may be considered that the current scene where the user is actually present is not consistent or matched with the identified scene. According to an embodiment, information regarding location, image and voice may be collected iteratively to identify the scene.

In operation 107, volume settings corresponding to the identified scene may be recommended to a user or applied without the user's confirmation according to personalized volume settings at the identified scene.

According to an embodiment, when the operation 104 is performed during setting the volume, operation 107 may not be performed. That is, volume setting may be performed according to the user's input in operation 104 because a priority volume settings corresponding to the identified scene is lower than that of the volume setting input by the user.

Detailed processing involved in the FIG. 1 will be described below.

Image recognition may be performed in operation 102 of FIG. 1. The image recognition may be carried out periodically. The image recognition will be further explained by referring to FIG. 2.

Figure 2:
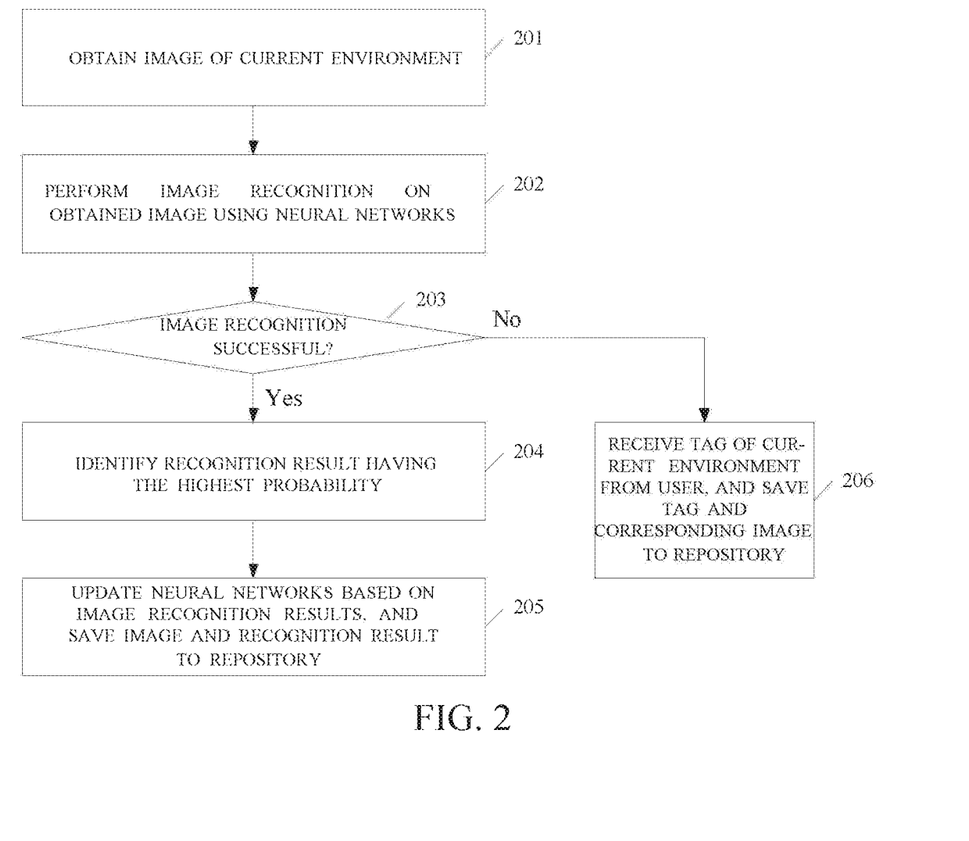
FIG. 2 is a flowchart illustrating an example image recognition processing method, according to an embodiment.

FIG. 2 is a flow chart illustrating an example image recognition processing method, according to an embodiment.

Referring to FIG. 2, CNN is taken as an example, not by way of limitation, to perform the learning and recognition of images, and the following operations may be performed by CNNs.

According to an embodiment, in operation 201, an image of the current environment may be obtained.

According to an embodiment, the image may be automatically collected by a camera of the terminal capturing environments around a user (the terminal). According to an example embodiment, the image may be collected manually by the user. According to an embodiment, an image taken at a current location of the user or the terminal may be searched in the terminal according to the location information obtained at operation 101, and the searched image may be taken as the image of the current environment. According to an embodiment, an image taken at a current location of the user or the terminal may be searched in the Internet or an external storage to which the terminal is connected.

According to an embodiment, in operation 202, the image of the current environment may be recognized by CNN.

Machine learning process may be carried out by CNN. A photo model repository, such as CIFAR-100 and the like, may be used for image recognition. According to an embodiment, in operation 203, whether the image recognition is successful may be determined. According to an embodiment, operation 204 may be performed when an image is successfully recognized. Operation 206 may be performed when an image is not successfully recognized.

In operation 204, the image recognition result with the highest probability may be identified from a plurality of image recognition results as the environmental information of the current environment image.

According to an embodiment, neural networks and/or the photo model repository may be updated in operation 205.

In operation 205, parameters of the neural networks may be updated according to the image recognition result, and the image of the current environment and the image recognition result thereof may be added to the photo model repository. Herein, the neural networks may be CNN, but is not limited thereto. For example, the neural networks may be a recurrent neural network (RNN), a restricted Boltzmann machine (RBM), a deep belief network (DBN), a bidirectional recurrent DNN (BRDNN), deep Q-networks (DQN), a generative adversarial network (GAN), or the like.

After each image recognition is completed, the parameters of the convolutional neural network may be updated according to the image recognition result so as to further improve the accuracy of image recognition. For example, weight values may be adjusted in the convolutional neural network. Use and updating of the neural network may be carried out by existing method, which will not be described redundantly herein.

Further, the image recognition result and the corresponding image may be added to the photo model repository for subsequent image recognition.

In operation 206, a tag for the image of the current environment may be input by the user, and the tag and the corresponding image may be added into the photo model repository.

The image recognition may fail due to various reasons. For example, a recognition module may be abnormal, the terminal may fail to read the image, or the like. When image recognition fails, the current image recognition processing may be terminated. According to an embodiment, the image may be manually added with a tag through operation 206, and the tag and the corresponding image may be added to the photo model repository for subsequent image recognition. An image tag input by the user may be taken as environmental information of the current environment image, and may be used later to identify a scene where the user is most likely to be present.

According to an embodiment, sound recognition and determination of noise level may be performed in operation 103 in FIG. 1. An operation of recognizing sound and an operation of determining the noise level may be carried out periodically, which will be further explained by referring to FIG. 3.

Figure 3:
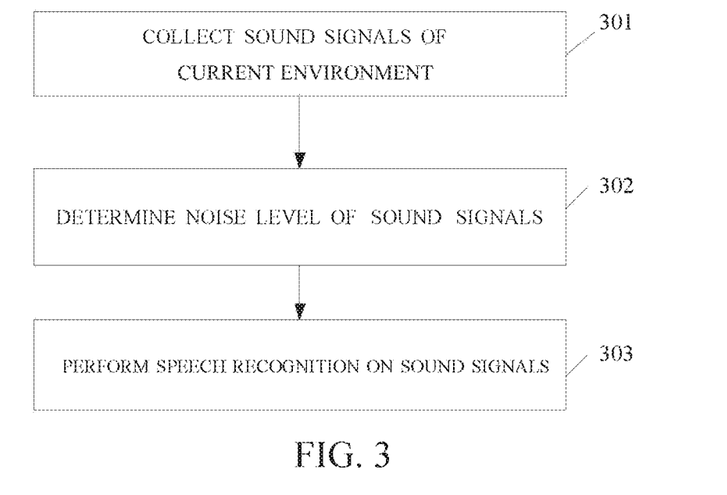
FIG. 3 is a flowchart illustrating an example sound processing method, according to an embodiment.

FIG. 3 is a flow chart illustrating an example sound processing method, according to an embodiment.

Referring to FIG. 3, the following operations may be performed.

According to an embodiment, in operation 301, the sound signal of the current environment may be collected.

According to an embodiment, in operation 302, a volume value of the collected sound signal, that is, noise level may be determined.

Whether the current environment is quiet or noisy may be determined according to the noise level.

According to an embodiment, in operation 303, speech recognition may be performed on the sound signal. Generally, for better speech recognition, the sound signal may be processed, such as being preprocessed, Fourier transformed, and the like firstly, and then speech recognition may be performed. Preprocessing and Fourier transformation may be carried out by existing methods, which will not be described redundantly herein.

According to an embodiment, speech recognition may be performed by a recurrent neural network (RNN) which is trained based on sound signals collected by the terminal.

According to an embodiment, the processing of the speech recognition may be carried out after the recognition result of the current environment image is determined. According to an embodiment, the environmental information, such as ceiling and the like, may be determined according to the image recognition result, and then, a scene where a user is most likely to be present may be determined based on the environmental information. According to an embodiment, scene types matching the environment information may be identified from a database. For example, scene types matching the ceiling recognized in the image may be offices, train stations and the like, but not limited thereto. Based on the identified scene types, each speech probability that the recognized speech corresponds to each of the scene types may be determined according to the speech recognition result, and the determined speech probability may be used later for determining scene where the user is most likely to be present. If any result cannot be obtained from the sound signal of the current environment, the current recognition may be ignored. That is, the speech probability may be no longer taken into account to determining a scene where the user is most likely to be present.

Operation 105 in the flow of FIG. 1 is described in details, that is, determining the scene with the highest probability according to the environment information, the noise level and the current location information. Here, an operation of determining the scene with the highest probability will be further explained by referring to FIG. 4.

Figure 4:
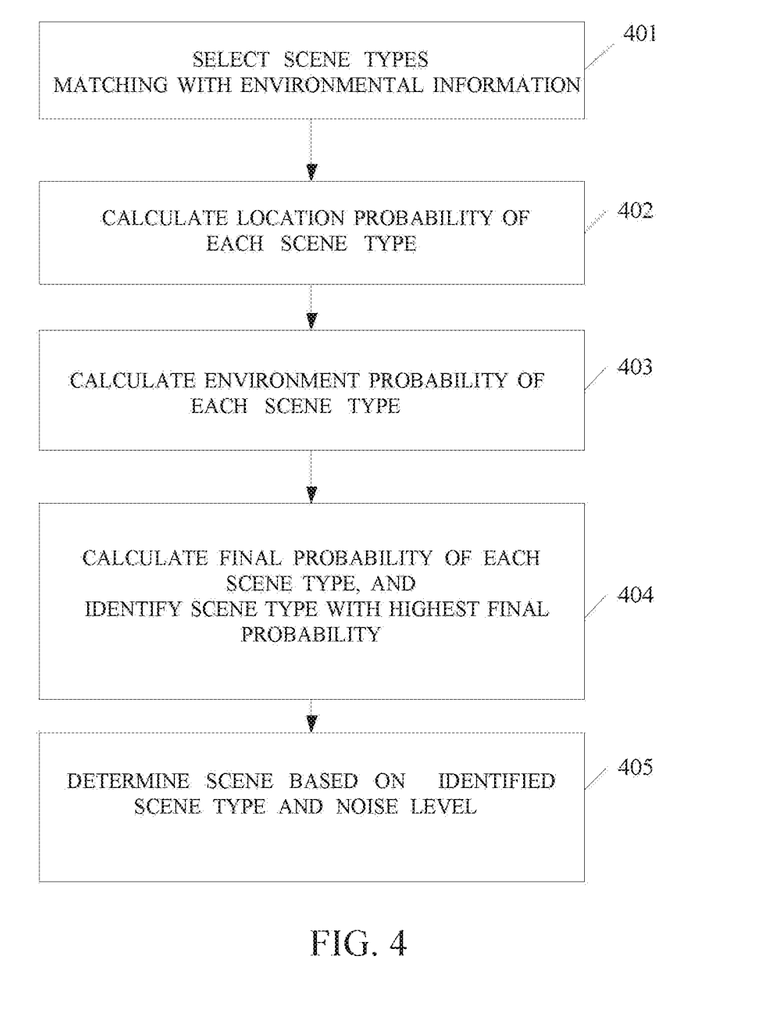
FIG. 4 is a flowchart illustrating an example method of determining final probability information for a scenario, according to an embodiment.

FIG. 4 is a flow chart illustrating an example method of determining final probability information for a scene, according to an embodiment.

Referring to FIG. 4, the following operations may be performed.

According to an embodiment, in operation 401, the scene types matching the environmental information may be identified from a database, and a initial probability of each of the scene types may be set to be 1/N, but is not limited thereto.

As mentioned above, after completing the image recognition, the environmental information of the current environment image may be determined, that is to say, the image recognition result with the highest probability may be determined. The environmental information may vary according to different scene types. For example, when "ceiling" is recognized in the image, the environmental information may be offices or train stations that match the ceiling, and the scene types matching the environmental information may be identified in the database, wherein information about relationships between the scene types and the image recognition results may be stored in the database. The determined scene types matching the environmental information may be multiple. For each of the scene types, the initial probability may be set to be 1/N. That is to say, probabilities of determined scene types may be set initially as being equal to each other, but is not limited thereto.

According to an embodiment, in operation 402, a location-based probability, that a user is likely to be present in a scene type, of each of the scene types may be calculated according to a distance between the current location and a location of the corresponding scene type.

After each of the scene types is determined through operation 401, the location-based probability of each of the scene types may be calculated according to the distance between the current location and the location of the corresponding scene type. For example, location-based probability that the current location is an office may be 50%, while location-based probability of that the current location is a train station may be 25%, and these location-based probabilities may be determined according to geographical locations of the terminal. According to an embodiment, when the current location is less than 100 m far away from a certain location of a certain scene type, it may be considered that location-based probability that the current location corresponds to the certain location is 80%. When the current location is 100-500 m far away from the certain location, it may be considered that location-based probability that the current location corresponds to the certain location is 60%. Each location-based probability of each of the scene types may be determined based on a distance between the current location and the location of the scene. Each location-based probability of each scene types may be determined according to a pre-defined relationship between distance and probability.

According to an embodiment, in operation 403, an environmental probability, that a user is likely to be present in a scene type, of each of the scene types may be calculated based on the initial probability and the location-based probability of each of the scene types according to preset weight values of the location-based probability and the initial probability in the environmental probability.

The weight values of the location-based probability and the initial probability in the environmental probability may be preset. For example, a weight value of the locational probability may be set to be $\alpha$ and a weight value of the initial probability may be determined to be $\beta$ according to the image recognition result, the environmental probability of a scene type may be equal to $a*\alpha+b*\beta$, wherein, a and b are the location-based probability and the initial probability of the scene type respectively, and $\alpha+\beta=1$.

According to an embodiment, the speech recognition may be performed on the sound signal as illustrated in FIG. 1. When the speech recognition is successful, a sound probability obtained through speech recognition may be further taken into account to calculate the environmental probability of each scene type. According to an embodiment, the environmental probability of each of the scene types may be calculated based on the initial probability, the location-based probability and the environmental probability information of the each of the scene type, according to the preset weight values of the location-based probability, the initial probability and the sound probability in the environmental probability. According to an embodiment, a weight value of the location-based probability may be set to be $\alpha$ and a weight value of the initial probability may be determined to be $\beta$ according to the image recognition result, a weight value of the sound probability may be determined to be $\gamma$ according to the speech recognition result, the environmental probability of a scene type may be equal to $a*\alpha+b*\beta+c*\gamma$, where a, b and c are the location-based probability, the initial probability and the sound probability of the scene type respectively, and $\alpha+\beta+\gamma=1$.

According to an embodiment, in operation 404, a final probability, that a user is likely to be present in a scene type, of each of the scene types may be calculated based on the environmental probability and the location-based probability of each of the scene types according to preset proportions of the environmental probability and the location-based probability in the final probability, and the scene type with the highest final probability is selected as the final scene type.

In this operation, the calculation of the final probability may be similar to described above, i.e., the final probability may be calculated according to the environmental probability obtained at operation 404 and the location-based probability obtained at operation 402. The sum of the proportions of the environmental probability and the location-based probability in the final probability may be 1.

According to an embodiment, in operation 405, all scenes matching the final scene type may be determined, and a scene satisfying the noise level determined at operation 103 may be identified as the final scene type. The final probability of the final scene type may be taken as the probability of the scene.

When the final scene type is determined as an office, the scene corresponding to the office may have a plurality of noise levels (decibel level) of the sound, which correspond to quietness, nosiness and the like. An appropriate scene may be identified from all scenes matching the final scene type according to the decibel value of the sound signal, and the probability of the final scene type may be taken as the probability of the selected scene.

For example, the scene type may be determined to be an office, and the noise level may be measured in decibels in the office. For example, in the same scene type, there may be a plurality of noise levels. Therefore, each scene may be represented as Office Noisiness level 1, Office Noisiness level 2, Office Noisiness level 3 (60-80 dB) according to the determined scene type and noise levels. When the determined decibel value of the sound signal is 70, Office Noisiness level 3 (60-80 dB) may be selected as a scene where the user is most likely to be present.

According to an embodiment, after the probability information of the selected scene finally is determined, and then operation 106 may be performed.

An example of determining a scene where a user is most likely to be present, and controlling the volume according to an embodiment will be explained below. According to an embodiment, the noise level of a sound signal may be measured in decibels, and learning and recognition of an image may be carried out by CNN.

An image of the current environment may be collected and recognized, wherein CNN may be used to recognize an object in the image. CNN may include operations of convolution, max pooling, and full connection of the neural network. According to an embodiment, the convolution may be performed three times, the max pooling may be performed twice, and the full connection may be performed once. For example, a first convolution, a first max pooling, a second convolution, a third convolution, a second max pooling, and the full connection may be performed in an order, and the fully connected neural network may be used for image recognition, but is not limited thereto. After the image recognition is performed as explained by referring to FIG. 2, the scene types and the initial probabilities thereof may be determined as shown in table 2.

TABLE 2

| Office Probability | Station Probability | Bus Probability | ... |
|---|---|---|---|
| 33 | 33 | 33 | ... |

According to an embodiment, a sound signal may be collected as explained by referring to FIG. 3, and a decibel value may be determined and speech recognition may be also carried out. After completing the speech recognition, the sound probabilities of various scene types and the decibel values of current environment may be determined as shown in table 3.

TABLE 3

| decibel (dB) | Office Probability | Station Probability | Bus Probability | ... |
|---|---|---|---|---|
| 35 | 50.8 | 32.9 | 6.2 | ... |

According to an embodiment, the probability information of various scenes may be determined as explained by referring to FIG. 4. The probability of each scene may be consistent with the probability of the scene type matching the corresponding scene. For example, when the scene type is office, the probabilities of various scenes (such as Office Quietness level 1, Office Quietness level 2, etc.) matching the scene type may be consistent with the probability information of the office. Here, scene 1 of Table 4 may refer to "Quietness level 1 (20-40 dB), at office". The probability information obtained as explained by referring to FIG. 4 is shown as table 4. The probability information shown in Table 4 may be the one obtained for the first time.

TABLE 4

| Preconditions | | | | | | Result |
|---|---|---|---|---|---|---|
| Image analysis | Sound analysis | User's Personal settings | User's Location | Reference Scene | Fit Scene Name | Final Probability |
| The probability of Office is 30% | Quieter, occasionally has a voice | Get user's personal settings | longitude: xx latitude: xx xx Road, xx Street | Office | Scene 1 Scene 5 Scene 6 | 50% 30% 20% |

As can be seen from table 4, the finally selected scene is scene 1 with the probability of 50%. When the probability threshold is 90%, the scene probability 50% is below the probability threshold. Therefore, the scene information may not be used for volume settings. According to an embodiment, operations to collect images and sounds may be repeated so as to re-determine accurately a scene where the user is most likely to be present. According to an embodiment, when the final scene probability is calculated, the result of the final scene probability may be saved. After the image and the sound are collected again, the determination of a scene may be carried out again. When the finally selected scene is still scene 1 with the probability of 70%, the scene information may not be used because the scene probability 70% is still below the probability threshold. However, the result of the final scene probability may be saved. Then, the collection of images and sounds may be carried out repeatedly from the beginning. After N times of repetition of collection, when the finally selected scene is scene 1 with the probability of 90%, the current scene may be determined as scene 1, and recommendation or setting of volume combination may then be carried out according to table 5.

Figure 5:
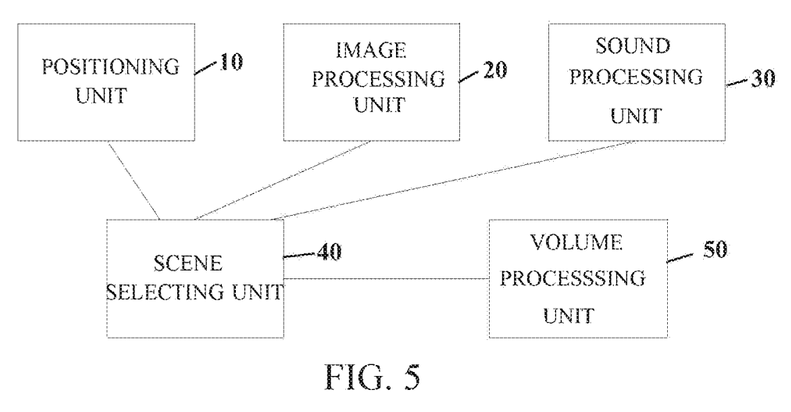
FIG. 5 is a block diagram illustrating an example device for volume control according to an embodiment.

FIG. 5 is a basic structure diagram of a device for volume control according to an embodiment.

As shown in FIG. 5, the device may include a positioning unit 10, an image processing unit 20, a sound processing unit 30, a scene selecting unit 40 and a volume processing unit 50. Each unit of the device may be a software module, a hardware module, or a combination of the software module and the hardware module, but is not limited thereto. Units of the device are named, merely for the sake of brevity, to explain its role or function, and should not be understood to only perform a specific operation. An operation described as being performed by a certain unit may be performed by another unit, or by a plurality of units in the device. An operation described as being performed by the device may be performed by another device.

The device may include a processor and a memory. The processor may include a plurality of processors. The processor controls a component of the device. The memory stores instructions. When the instructions are executed by the processor, the instructions control the processor or the device to perform a corresponding operation or function described herein.

The positioning unit 10 may collect current location information of a terminal. The image processing unit 20 may obtain an image of current environment, input the image into an image recognition model generated by training, recognize the image according to a photo model repository to obtain an image recognition result, and determine current environmental information according to the image recognition result. The sound processing unit 30 may collect a sound signal of the current environment to perform speech recognition, and determine a noise level of the collected sound signal. The scene selecting unit 40 may determine a scene with the highest probability currently according to the environmental information, the noise level and the current location information, notify a volume processing unit 50 in

TABLE 5

| | Call | System | Ringtone | Multimedia | Alarm | Notification | Key | BT | TTS |
|---|---|---|---|---|---|---|---|---|---|
| Scene 1 | 1 | 1 | 2 | 1 | 3 | 1 | 0 | 10 | 5 |
| Scene 2 | 3 | 3 | 4 | 3 | 4 | 2 | 1 | 10 | 8 |
| Scene 3 | 5 | 6 | 6 | 12 | 6 | 6 | 12 | 10 | 10 |
| Scene 4 | 5 | 7 | 7 | 15 | 7 | 7 | 15 | 10 | 10 |
| Scene 5 | 1 | 1 | 2 | 1 | 3 | 1 | 0 | 10 | 5 |
| ... | ... | ... | ... | ... | ... | ... | ... | ... | ... |

The disclosure may further provide a device for volume control that carries out the method for volume control above.

the event that the probability of the scene may be greater than a set probability threshold, or otherwise notify the positioning unit 10 and the image processing unit 20 to perform respective operations again. The volume processing unit 50 may determine a volume setting corresponding to the scene determined by the scene selecting unit 40 for recommendation or setting directly according to a preset correspondence of scene-volume after receiving the notification from the scene selecting unit 40.

The scene selecting unit 40 may include an environmental probability calculating subunit, a final probability calculating subunit, and a scene determining subunit. The environment probability calculating subunit may select scene types matching the environmental information from a database, and set an initial probability of each scene type to be 1/N, calculate a location-based probability of the corresponding scene type according to a distance between the current location information and a location of the corresponding scene type, and calculate an environmental probability of each of the scene types based on the initial probability and the location-based probability of each of the scene types according to preset proportions of the location-based probability and the initial probability in an environmental probability. The final probability calculating subunit may calculate a final probability of each of the scene types based on the environmental probability and the location-based probability of each of the scene types according to preset proportions of the environmental probability and the location-based probability in the final probability, and select the scene type with the highest final probability as a final scene type. The scene determining subunit may determine all scenes matching the final scene type, select therefrom a scene satisfying the noise level as a scene with the highest probability currently, and take the probability of the final scene type as the probability of the scene.

The sound processing unit 30 is further configured to perform speech recognition on the sound signal of the current environment, and determine a speech probability of each of the scene types according to a speech recognition result. The environmental probability calculating subunit is calculate the environmental probability of each of the scene types based on the speech probability of each of the scene types according to a preset proportion of the speech probability in the environmental probability.

According to embodiments, based on machine learning, a terminal may collect usage scenes thereof continuously, including collecting videos, audios, user habits and the like, and finally complete all intelligent volume settings of the mobile phone in any scene to meet user's real requirement in various scenes.

Figure 6:
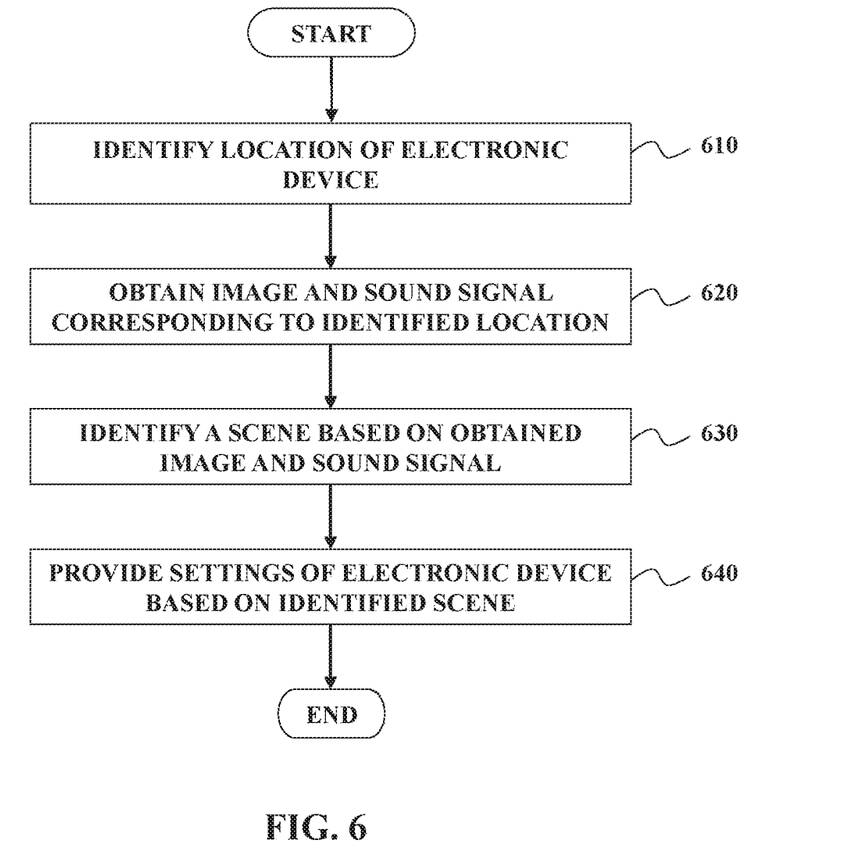
FIG. 6 is a flowchart illustrating an example method according to an embodiment.

FIG. 6 is a flowchart illustrating an example method according to an embodiment.

Referring to FIG. 6, a location of an electronic device may be identified in operation 610. The location of the electronic device may be identified based on various positioning method.

Image and sound signal corresponding to the identified location may be obtained in operation 620. The image and sound signal corresponding to the identified location may be automatically obtained, but is not limited thereto. For example, the image corresponding to the identified location may be obtained while a camera is activated in the electronic device by a user. The sound signal corresponding to the identified location may be obtained while a microphone is activated in the electronic device by a user. The microphone may be activated with the camera.

A scene where the electronic device is present may be identified based on the image and sound signal in operation 630. According to an embodiment, the scene may be identified using a trained neural network. The neural network may be trained using images and sound signals collected by the electronic device. Methods of identifying the scene using neural network are explained above, which will not be repeatedly explained.

Settings of the electronic device may be provided based on an identified scene in operation 640. According to an embodiment, the settings may be the same settings which were applied to the electronic device at the same scene. The settings may be volume settings, but are not limited thereto. For example, the settings may include muting and unmuting the electronic device. The settings may be automatically applied to the electronic device in operation 640. The settings may be proposed to a user in operation 640.

Figure 7:
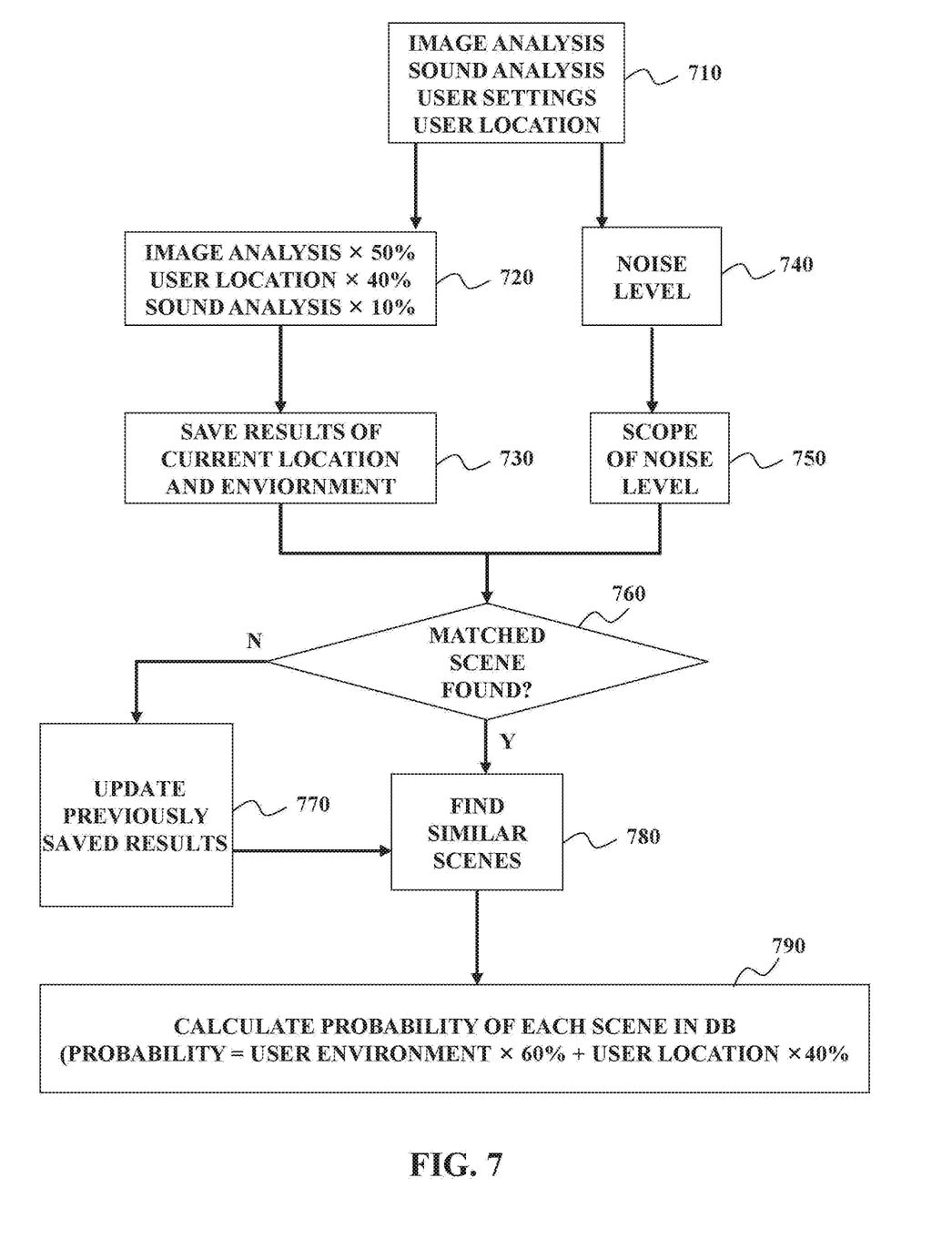
FIG. 7 is a flowchart illustrating in detail an example method according to an embodiment.

FIG. 7 is a flowchart illustrating in detail an example method according to an embodiment.

The example method may be performed by the electronic device.

Referring to FIG. 7, in operation 710, a location of the electronic device may be identified, and image analysis may be performed on an obtained image to generate image recognition results. Furthermore, sound analysis may be performed on the obtained sound signal in operation 710. Furthermore, Information about user's personalized settings at the location may be obtained in operation 710. The image and the sound signal may be obtained at or around the location. The user's personalized settings may have the top priority over other factors. When the user adjusts settings at the location on his own, then the adjusted settings may be stored in the information about the user's personalized settings, and may be applied to the electronic device again regardless of other factors when the electronic device is determined to be in the same location.

In operation 720, results of the image analysis, sound analysis, and the location may be multiplied by predetermined weight values. For example, the results of the image analysis may be multiplied by 50%, the results of the location of the terminal may be multiplied by 40%, results of the sound analysis may be multiplied by 10%. A sum of the predetermined weight values may be equal to 1. The weight values may be adjusted as neural networks are trained.

In operation 730, results of analysis at the location may be saved in the electronic device. Herein, the location and environment may be saved with the results of the analysis. The location may be a current location of the electronic device. Herein, the location and environment may indicate a scene where the user is present or a scene type.

In operation 740, a noise level may be determined based on the sound signals around the location of the electronic device. The noise level may be a noise level at the location of the electronic device. The noise level may be expressed in decibel.

In operation 750, a scope of the noise level may be determined, and saved in the electronic device.

In operation 760, it may be determined whether a matched scene is present in previously saved analysis results. When a matched scene is not present in the previously saved analysis results, then a currently identified scene (that is, the current location and environment) may be added to the previously saved results to update the saved results in operation 770.

When a matched scene is present in the previously saved results, scenes similar to a currently identified scene (that is, the current location and environment) is found in operation 780.

In operation 790, probability of each of the found scenes may be calculated in operation 790. According to an embodiment, when calculating the probability of each of the found scenes, 60% of a weight value may be applied to an environment, and 40% of a weight value may be applied to a location.

A scene with the highest probability among the found scenes may be determined. When the determined scene has the probability exceeding a threshold, settings previously applied to the determined scene may be applied to the electronic device again.

According to an embodiment, a computer readable storage medium storing a computer program is further provided. The computer readable storage medium stores a computer program that, when executed by a processor, causes the processor to execute a method of displaying an icon in an electronic terminal. The computer readable storage medium is any data storage device that can store data which is read by a computer system. Examples of the computer readable storage medium includes: a read only memory (ROM), a random access memory (RAM), a read-only optical disc, a magnetic tape, a floppy disk, an optical data storage device, and a carrier wave. A computer program product may be or include the computer readable storage medium, but is not limited thereto. For example, the computer readable medium may include the computer program product.

Moreover, it should be understood that various units according to an embodiment may be implemented as hardware components and/or software components. Those skilled in the art can implement the various units, for example, using a Field Programmable Gate Array (FPGA) or an Application Specific Integrated Circuit (ASIC), depending on the processing performed by the various defined units.

Further, embodiments may be implemented as computer codes in a computer readable recording medium by those skilled in the art according to the disclosure. The computer codes are carried out when the computer codes are executed in a computer.

Although the disclosure has been described with various embodiments, various changes and modifications may be suggested to one skilled in the art. It is intended that the disclosure encompass such changes and modifications as fall within the scope of the appended claims.

What is claimed is:

1. An electronic device comprising:
   a memory storing instructions; and
   at least one processor configured to execute the instructions stored in the memory to:
   identify a location of the electronic device;
   obtain an image and a sound signal corresponding to the location;
   identify at least one scene type corresponding to the image;
   calculate a probability that the electronic device is present in the at least one scene type based on a distance between the location of the electronic device and a location of the at least one scene type;
   identify, using a trained neural network, a scene where the electronic device is present, from the at least one scene type based on the sound signal and the calculated probability; and
   provide settings of the electronic device based on the identified scene.

2. The electronic device of claim 1, wherein the trained neural network is trained using images and sound signals collected by the electronic device.

3. The electronic device of claim 1, wherein the identified scene corresponds to a probability that the electronic device is present in the scene.

4. The electronic device of claim 3, wherein the probability of the identified scene exceeds a threshold.

5. The electronic device of claim 3, wherein the probability of the identified scene is highest among other probabilities of scenes.

6. The electronic device of claim 1, wherein the scene is identified based on a noise level of the sound signal.

7. The electronic device of claim 1, wherein the scene is identified based on speech recognition on the sound signal.

8. The electronic device of claim 1, wherein the provided settings of the electronic device are settings which were applied to the electronic device at the same scene.

9. The electronic device of claim 1, wherein the settings comprise muting the electronic device and unmuting the electronic device.

10. The electronic device of claim 1, wherein the image is recognized using a first neural network, the sound signal is recognized using a second neural network, and the scene is identified using a third neural network.

11. The electronic device of claim 1, wherein the image is captured around the location, and the sound signal is recorded by the electronic device around the location.

12. A method comprising:
    identifying a location of an electronic device;
    obtaining an image and a sound signal corresponding to the location;
    identifying at least one scene type corresponding to the image;
    calculating a probability that the electronic device is present in the at least one scene type based on a distance between the location of the electronic device and a location of the at least one scene type;
    identifying, using a trained neural network, a scene where the electronic device is present, from the at least one scene type based on the sound signal and the calculated probability; and
    providing settings of the electronic device based on the identified scene.

13. The method of claim 12, wherein the identified scene corresponds to a probability that the electronic device is present in the scene, and the probability of the identified scene exceeds a threshold, or is highest among other probabilities of scenes.

14. The electronic device of claim 12, wherein the provided settings of the electronic device are settings previously applied to the electronic device at the same scene at least once.

15. The method of claim 12, wherein the image is captured around the location, and the sound signal is recorded by the electronic device around the location, and
    wherein the image is recognized using a first trained neural network, the sound signal is recognized using a second trained neural network, and the scene is identified using a third trained neural network.

16. A computer program product comprising a computer-readable recording medium having recorded thereon a program executable by a computer for performing a method comprising:
    identifying a location of an electronic device;
    obtaining an image and a sound signal corresponding to the location;
    identifying at least one scene type corresponding to the image;

calculating a probability that the electronic device is present in the at least one scene type based on a distance between the location of the electronic device and a location of the at least one scene type;

identifying, using a trained neural network, a scene where the electronic device is present, from the at least one scene type based on the sound signal and the calculated probability; and providing settings of the electronic device based on the identified scene.

17. The computer program product of claim 16, wherein the identified scene corresponds to a probability that the electronic device is present in the scene, and the probability of the identified scene exceeds a threshold, or is highest among other probabilities of scenes.

18. The computer program product of claim 16, wherein the provided settings of the electronic device are settings previously applied to the electronic device at the same scene at least once.

19. The computer program product of claim 16, wherein the image is captured around the location, and the sound signal is recorded by the electronic device around the location, and wherein the image is recognized using a first trained neural network, the sound signal is recognized using a second trained neural network, and the scene is identified using a third trained neural network.

* * * * *